Patented Mar. 11, 1947

2,417,344

UNITED STATES PATENT OFFICE 2,417,344

COATING COMPOSITION

Gerald R. Barrett, Winchester, Mass., assignor to Monsanto Chemical Company, St. Louis, Mo., a corporation of Delaware No Drawing. Application May 8, 1942,
Serial No. 442,232

8 Claims. (Cl. 106—186)

This invention relates to the preparation of improved coating compositions, and particularly to the preparation of lacquer compositions containing pigments, aerogels or like substances tending to settle.

It has been recognized for many years that pigmented coatings, such as paints and varnishes, are subject to what is known as "hard settling," i. e., that type of settling which results in the formation of a hard cake which is very difficult to redisperse. In general, highly dispersed pigments settle slowly, but are especially subject to hard settling of the type described. A flocculated pigment suspension, on the other hand, settles rapidly, but forms a voluminous, loosely packed layer, enclosing considerable liquid in the pores and capable of easy redispersion. The extent of settling and the degree of flocculation usually depend not only upon what is adsorbed at the surface of the pigment but also upon the nature of the adsorbed layer and upon the nature of the liquid in which the pigment and its adsorbed layer are suspended.

In the case of pure liquids, non-polar solvents tend to yield flocculated suspensions while polar liquids tend to yield dispersed, hard settling types. In non-polar liquids, such as benzene, the presence of or addition of an amount of water sufficient to coat the suspended pigment with a monomolecular layer of water tends to promote flocculation and the formation of more voluminous sediments than is the case with pure liquids not containing water. As the polarity of the solvent increases, however, that is, as its kinship with water becomes closer, the addition of water becomes less effective and the pigment tends more and more to settle hard. In the case of ethyl acetate, for example, which is more polar than benzene, a larger amount of water is necessary to give a certain degree of flocculation as measured by the volume of the settled pigment layer. In the case of methanol, which is more polar still, no amount of water produces flocculation.

Numerous efforts have been made to avoid the effects of hard settling, in some instances, with considerable success. Small amounts of stearates, such as sodium, aluminum and zinc stearate, for example, have been added to paints, varnishes and lacquers for the purpose of flocculating or preventing the hard settling of such substances as diatomaceous earth. These materials, however, tend to weaken the film formed upon applying the coating, and to reduce its adhesion to metals or other surfaces. They also tend to form agglomerates which result in rough or otherwise objectional films.

As indicated above, water is also in some instances effective in preventing hard settling, and this supplies not only to ordinary pigments, but also to aerogel containing lacquers, particularly if the concentration of the nitrocellulose or other binder in the lacquer is not too low. Lacquers, however, commonly comprise mixtures of more or less polar solvents, such as esters, ketones and alcohols, with hydrocarbons, which are essentially non-polar, and as the proportion of hydrocarbons is decreased, more and more water is required for flocculation, while in some cases no amount of water will produce satisfactory suspensions. In any case, the addition of large amounts of water is inadvisable, as it increases the possibility of contamination or discoloration of the coating in the presence of metals.

It is a primary object of the present invention to provide an improved method of preventing hard settling in coating compositions.

A further object of the invention is to prepare soft settling coating compositions which do not form weak or poorly adhering films upon drying.

A further object of the invention is to prepare soft settling coating compositions of the type described, which previously could not be made soft settling because of the low concentration of the binder and/or the excessive polarity of the vehicle used.

A further object of the invention is to provide an agent for incorporation in lacquers or other coating compositions which not only acts to prevent hard settling, but tends to prevent deterioration or discoloration of the coating when in the presence of metals.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is carried out in general by admixing with the pigmented coating solution small, and in most instances, minute amounts of an ammonium, alkylamine, alkylolamine, alicyclic amine or heterocyclic amine salt of a suitable inorganic or organic acid. The salt employed should be soluble in the coating vehicle in the small amount required and should be a salt of at least moderately ionizable constituents. Specific salts which may be used in accordance with the invention include: the mono, di and tributyl and amyl amine salts of ortho and pyrophosphoric acids; dibutyl amine sulfate; triamyl amine malate; the ammonium salts of maleic and phthalic acids; and the diethyl amine, mono, di, and tributyl and amyl amine and the cyclohexyl amine and morpholine salts of citric acid.

Instead of adding salts, as such, to the coating solution, it is also possible to add separately a suitable amine or ammonia, and an acid capable of reacting with the amine to form a salt having the desired anti-settling or flocculating action. In every instance it is essential that the resulting salt be thoroughly soluble in the solvents of the coating, that is, thoroughly soluble at least in the small amount required. Both substances should also be at least moderately ionizable, as previously indicated.

In those instances where the coating composition is already quite acid, that is, already contains appreciable quantities of acid, as for example in lacquer containing shellac, copals, alkyd resins, et cetera, the addition of acid is unnecessary, and suitable results may be obtained by merely adding an amine or ammonia to the coating composition. Moreover, quaternary ammonium compounds, such as cyclohexyl trimethyl ammonium hydroxide, dicyclohexyl dimethyl ammonium hydroxide, phenyl trimethyl ammonium hydroxide, and phenyl ethyl dimethyl ammonium hydroxide, may be used in all instances without acid addition, as these compounds are all very highly ionizable and do not require the addition of an ionizable acid to obtain the desired results.

In determining what substances are suitable and what degree of ionization is required for the purposes of this invention, tests were made by adding varying but in all instances minute amounts of selected salts or hydroxides, or mixtures of amines and acids capable of forming salts of the type described, to a lacquer solution prepared by mixing 9 parts by volume of commercial butyl acetate with one part by volume of a base grind of the following composition:

| | Per cent by weight |
|---|---|
| Butyl acetate | 25 |
| Butyl alcohol | 20 |
| Toluene | 29 |
| Denatured alcohol | 2.4 |
| Blown castor oil | 5 |
| ½ sec. nitrocellulose | 5.5 |
| Santocel (silica aerogel) | 13.1 |

This permitted a relatively accurate comparison of the relative effectiveness of the various substances tested. As a result it was discovered that the amine or ammonium salts or hydroxides, or the mixtures of amines and acids, to be effective, must be soluble in the liquid being treated and must be capable of developing a high concentration of $NR_1 R_2 R_3 R_4^+$ ions, in which $R_1, R_2, R_3, R_4$ represent either hydrogen or an organic radical. Where the amine or ammonium hydroxide, or the acid in combination with it, has little tendency to dissociate, the effect is to produce in the solution not the active $NR_1 R_2 R_3 R_4^+$ ion, but the free amine $NR_1 R_2 R_3$, which is inactive.

Of the amines tested, including ammonia, those which were effective for the purposes of this invention all had a dissociation constant within the range of $1 \times 10^{-3}$ to $1.8 \times 10^{-5}$. In order to be effective however, the amines should be used in the presence of, or in the form of salts of acids about as strong as or stronger than formic acid, which has a dissociation constant of $2.4 \times 10^{-4}$. Moreover, the salts thus formed or used should be sufficiently soluble in the solution being treated to avoid any appreciable precipitation. Citric acid, which has a primary dissociation constant of $8 \times 10^{-4}$, gives somewhat more satisfactory results than formic acid, while acetic acid, which has a dissociation constant of $1.9 \times 10^{-5}$, is distinctly less satisfactory than formic acid. Salicylic acid, which has a dissociation constant of $1 \times 10^{-3}$, would be expected to be satisfactory, but was found to be entirely unsuitable, probably because of the formation of a complex ion, which precluded the formation of the $R_1 R_2 R_3 NH^+$ ion in sufficient amounts.

Tests were also made with pyridine, which has a dissociation constant of $1.6 \times 10^{-9}$, and aniline, which has a dissociation constant of $4.6 \times 10^{-10}$, in both instances in combination with suitably strong acids. Salts of these bases however do not appreciably improve the hard settling characteristics of the lacquers treated, which indicates beyond doubt that the effectiveness of any soluble ammonium or amine compound employed depends largely upon the extent of its ionization.

When strong bases such as cyclohexyl trimethyl ammonium hydroxide are used, it is unnecessary to employ an acid, as such bases are sufficiently dissociated and have the desired effect on the lacquer, provided they are sufficiently soluble, without the addition of acids. In the case of the weaker bases, such as ammonia and the aliphatic amines, which in general have a dissociation constant of not less than about $1 \times 10^{-5}$, it is necessary to employ in combination therewith preferably an acid which is as strong or stronger than citric acid, but in any case about as strong as formic acid. Thus, the acid should have a dissociation constant of not less than about $1 \times 10^{-4}$.

In general, exceedingly small amounts of the salts or bases described herein as being suitable may be used. For example, as little as .0001 mol of alkylamine and an equal amount of acid for each 100 cc. of lacquer solution is sufficient. When the amounts of amine and acid are each reduced to less than .0001 mol per 100 cc. of solution, protection against hard settling in the lacquer is lost. Cyclohexyl trimethyl ammonium hydroxide and like quaternary ammonium compounds, however, may be used in amounts as low as .00005 mols per 100 cc. of solution. Larger amounts of the anti-settling or flocculating agent may be required, when the amount of pigment in the coating is increased.

A further understanding of the invention will be obtained from the following examples:

*Example I*

A commercial furniture lacquer was prepared by dissolving suitable amounts of 5 second nitrocellulose, a rosin-maleic acid-glyceride resin and a plasticizer in a conventional lacquer solvent mixture comprising a mixture of esters, alcohols and hydrocarbons. The resulting lacquer was given a dull or flat finish by incorporating therein a pebble mill grind of silica aerogel in such an amount as to provide 15% by weight of silica based on the weight of the solids in the lacquer. About 0.25% by weight of dibutyl amine pyrophosphate based on the total weight of the lacquer was then added after first dissolving the pyrophosphate in about an equal weight of denatured alcohol to facilitate mixing. The aerogel in the lacquer settled in a flocculent condition which permitted easy redispersion, whereas the same lacquer was subject to hard settling when the pyrophosphate was omitted.

Example II

To a solution containing 75 parts by volume of ethyl acetate and 25 parts of ethyl alcohol there was added about 6% by weight of 5 second nitrocellulose and about 0.2% of dewaxed shellac. The resulting lacquer was flattened by grinding into it about 1% by weight of silica aerogel based on the solids in the lacquer. About 0.075% by weight of dibutyl amine pyrophosphate based on the total weight of the lacquer was then added, the pyrophosphate being first dissolved in alcohol to facilitate mixing. The addition of the pyrophosphate effectually prevented the hard settling which occurred when the pyrophosphate was omitted.

Example III

Five percent by weight of silica aerogel based on the lacquer solids was ground in a pebble mill into a cellulose acetate lacquer of the following composition:

| | Per cent by weight |
|---|---|
| Toluene | 9.2 |
| Butyl acetate | 11.5 |
| Acetone | 26.4 |
| Ethyl acetate | 24.0 |
| Methyl Cellosolve | 15.6 |
| Methyl phthalyl ethyl glycollate | 9.2 |
| Cellulose acetate | 4.1 |

The silica aerogel in the above lacquer settled in a few hours to a compact mass, but when 0.05% by weight of dibutyl amine pyrophosphate based on the total weight of the lacquer was added thereto, only a slight subsidence to a soft voluminous layer occurred.

Example IV

To a lacquer consisting of 7% by weight of ethyl cellulose and 93% of acetone was added about 3% by weight of silica aerogel based on the solids in the lacquer. The suspension of silica aerogel thus formed was effectively stabilized against hard settling by adding to the lacquer about 0.3% by weight of dibutyl amine pyrophosphate based on the total weight of the lacquer whereas when the pyrophosphate was omitted the aerogel settled to a compact cake, not easily redispersed.

Equally good results were also obtained by adding small amounts of dibutyl amine pyrophosphate to compositions similar to the above, but in which the ethyl cellulose was replaced by cellulose acetobutyrate or chlorinated rubber.

Example V

A soft settling flat lacquer was prepared by first making a clear base of the following composition:

| | Per cent by weight |
|---|---|
| Ethyl acetate | 10 |
| Butyl acetate | 17 |
| Ethyl alcohol | 10 |
| Butyl alcohol | 10 |
| Aromatic petroleum naphtha | 30 |
| 5 second nitrocellulose | 5 |
| Rosin-maleic ester resin | 15 |
| Dibutyl phthalate | 1.5 |
| Blown castor oil | 1.5 |

A base grind of silica aerogel in a portion of the above clear vehicle was then prepared by mixing the following materials in a pebble mill in the proportions given:

| | Per cent by weight |
|---|---|
| Clear base | 74 |
| Silica aerogel | 15 |
| Butyl acetate | 10 |
| Citric acid | 1 |

The resulting grind was then mixed with additional clear base and monoamyl amine in the following proportions to give a final flat lacquer composition having very desirable soft settling characteristics.

| | Per cent by weight |
|---|---|
| Aerogel grind | 10 |
| Clear base | 89.96 |
| Monoamyl amine | 0.04 |

Although the examples refer solely to the treatment of lacquers which have been flatted with silica aerogel, it should be understood that the invention may be equally as well, if not more advantageously applied to other types of coating materials, such as paints, varnishes and "synthetics," to which aerogels or other forms of pigment have been added for any purpose. In general, however, there is more need for the flocculating agents described herein in lacquers, as lacquer solutions frequently contain a large proportion of polar solvents, which tend to increase the possibilities of hard settling.

The anti-settling or flocculating agents used in accordance with the invention may be added to the coating solutions in any desired manner. It is preferable however to first prepare a relatively concentrated solution of the flocculating agent in a solvent or solvent mixture which is readily miscible with the coating composition to be treated. Suitable solvents for this purpose include acetone, lower aliphatic alcohols, glycol mono ethers, and the like.

Aerogels may be added to the lacquer in varying amounts depending on the degree of flatting desired. Thus it is possible to employ the aerogels in amounts varying from 0.02 to 30% by weight based on the weight of the lacquer solids. When relatively high concentrations of silica aerogels are employed, it is advantageous first to incorporate in the lacquer a small portion of acid, such as phosphoric or citric acid, as the presence of the acid in the lacquer during the grinding tends either to lower the viscosity of the grind for a given silica concentration or permit a higher silica concentration for a given viscosity. A composition free of hard settling can then be obtained by treating the lacquer thus prepared with a suitable amine, which, if added during the grinding in of the aerogel, tends to raise the viscosity.

The primary, secondary and tertiary butyl or amyl amine salts of phosphoric or pyrophosphoric acid are preferred for the purposes of this invention, since they not only favorably affect the suspension of the aerogel or other pigment in the coating solution, but have a marked anti-corrosive action when used in coatings which are to be packaged in metal containers.

Where reference is made herein or in the appended claims to "pigments," it is to be understood that this includes not only the inorganic oxides commonly added to coatings for coloring and other purposes, but also aerogels, which are usually added to obtain a flat or dull finish in the applied coating. The term "hard settling"

What I claim is:

1. A lacquer composition comprising a cellulose derivative selected from the group consisting of cellulose esters and cellulose ethers, said derivative being thinned to a flowable consistency with a solvent therefor, an inorganic pigment suspended therein which tends to settle in the form of a hard cake, said pigment being selected from the group consisting of inorganic oxides and inorganic aerogels, and a small amount of dibutyl amine pyrophosphate, said pyrophosphate being present in the amount of not less than 0.0001 mols per 100 c.c. of said composition and in an amount sufficient to subsantially prevent the settling of said pigment in the form of a hard cake.

2. A lacquer composition comprising a cellulose derivative selected from the group consisting of cellulose esters and cellulose ethers, said derivative being thinned to a flowable consistency with a solvent therefor, an inorganic pigment suspended therein which tends to settle in the form of a hard cake, said pigment being selected from the group consisting of inorganic oxides and inorganic aerogels, and a small amount of monoamyl amine citrate, said citrate being present in the amount of not less than 0.0001 mols per 100 c. c. of said composition and in an amount sufficient to substantially prevent the settling of said pigment in the form of a hard cake.

3. A lacquer composition comprising a cellulose derivative selected from the group consisting of cellulose esters and cellulose ethers, said derivative being thinned to a flowable consistency with a solvent therefor, an inorganic pigment suspended therein which tends to settle in the form of a hard cake, said pigment being selected from the group consisting of inorganic oxides and inorganic aerogels, and a small amount of triamyl amine malate, said malate being present in the amount of not less than 0.0001 mols per 100 c. c. of said composition and in an amount sufficient to substantially prevent the settling of said pigment in the form of a hard cake.

4. The lacquer composition substantially as described in claim 1 but further characterized in that the inorganic pigment contained therein is an aerogel of an inorganic oxide.

5. A lacquer composition comprising a cellulose derivative selected from the group consisting of cellulose esters and cellulose ethers, said derivative being thinned to a flowable consistency with a solvent therefor, and silica aerogel, said composition having added thereto a small amount of dibutyl amine pyrophosphate, said pyrophosphate being added in the amount of not less than 0.0001 mols per 100 c. c. of said composition and in an amount sufficient to substantially prevent the settling of said aerogel in the form of a hard cake.

6. A lacquer composition comprising nitrocellulose thinned to a flowable consistency with a solvent therefor, and silica aerogel, said aerogel being present in an amount sufficient to provide from 0.02 to 30% of silica based on the weight of said nitrocellulose, said composition having added thereto from 0.02 to 0.5% by weight of dibutyl amine pyrophosphate based on the total weight of the lacquer composition and sufficient to substantially prevent the settling of said aerogel in the form of a hard cake.

7. A coating composition comprising an organic film-forming vehicle thinned to a flowable consistency with a solvent therefor, an inorganic pigment suspended therein which tends to settle in the form of a hard cake, said pigment being selected from the group consisting of inorganic oxides and inorganic aerogels, and a small amount of an ammonium compound selected from the group consisting of ammonium and amine salts of an acid other than salicylic acid, the basic constituent of said salts having a dissociation constant of not less than $1 \times 10^{-5}$ and the acid constituent of said salts having a dissociation constant of not less than $1 \times 10^{-4}$, said basic and acid constituents each being present in the amount of not less than 0.0001 mols per 100 c. c. of said composition and in an amount sufficient to substantially prevent the settling of said pigment in the form of a hard cake.

8. A coating composition comprising an organic film-forming vehicle thinned to a flowable consistency with a solvent therefor, and an inorganic pigment suspended therein which tends to settle in the form of a hard cake, said pigment being selected from the group consisting of inorganic oxides and inorganic aerogels, said composition having added thereto small amounts of an ammonic compound selected from the group consisting of ammonia and amines and an acid other than salicylic acid, said ammonic compound having a dissociation constant of not less than $1 \times 10^{-5}$ and said acid having a dissociation constant of not less than $1 \times 10^{-4}$, said ammonic compound and said acid each being added in the amount of not less than 0.0001 mols per 100 c. c. of said composition and in an amount sufficient to substantially prevent the settling of said pigment in the form of a hard cake.

GERALD R. BARRETT.

REFERENCES CITED

The following references are of record in the file of this patent:

UNITED STATES PATENTS

| Number | Name | Date |
|---|---|---|
| 2,245,104 | Greubel | June 10, 1941 |
| 2,192,954 | Sloan et al. | Mar. 12, 1940 |
| 2,192,956 | Sloan et al. | Mar. 12, 1940 |
| 2,288,413 | Morgan | June 30, 1942 |
| 2,192,955 | Sloan et al. | Mar. 12, 1940 |
| 2,126,925 | Ryan et al | Aug. 16, 1938 |
| 2,371,866 | Barrett | Mar. 20, 1945 |